Dec. 27, 1938.                Q. E. CONNER                2,141,205
                              AIR BRAKE SYSTEM
                           Filed Dec. 9, 1936            7 Sheets-Sheet 1

INVENTOR:
QUINTEN E. CONNER.
BY
*Bredwin Yale*
ATTORNEY.

Dec. 27, 1938.　　　　　Q. E. CONNER　　　　　2,141,205
AIR BRAKE SYSTEM
Filed Dec. 9, 1936　　　　7 Sheets-Sheet 2

INVENTOR:
QUINTEN E. CONNER
BY
*Baldwin Vale*
ATTORNEY

Dec. 27, 1938.　　　Q. E. CONNER　　　2,141,205
AIR BRAKE SYSTEM
Filed Dec. 9, 1936　　　7 Sheets-Sheet 3

INVENTOR:
QUINTEN E. CONNER.
BY Baldwin Yale
ATTORNEY

Dec. 27, 1938.  Q. E. CONNER  2,141,205
AIR BRAKE SYSTEM
Filed Dec. 9, 1936  7 Sheets-Sheet 4

FIG. 10.

INVENTOR:
QUINTEN E. CONNER.
BY Baedwin Vals
ATTORNEY

Dec. 27, 1938.    Q. E. CONNER    2,141,205
AIR BRAKE SYSTEM
Filed Dec. 9, 1936    7 Sheets-Sheet 5

FIG. II.

INVENTOR:
QUINTEN E. CONNER.
BY
Baldwin Vale
ATTORNEY.

Dec. 27, 1938.  Q. E. CONNER  2,141,205
AIR BRAKE SYSTEM
Filed Dec. 9, 1936  7 Sheets-Sheet 7

FIG. 13.

INVENTOR:
QUINTEN E. CONNER
BY Baldwin Yale
ATTORNEY

Patented Dec. 27, 1938

2,141,205

UNITED STATES PATENT OFFICE 2,141,205

AIR BRAKE SYSTEM

Quinten E. Conner, San Francisco, Calif.

Application December 9, 1936, Serial No. 115,022

14 Claims. (Cl. 303—60)

This invention relates to improvements in air brake systems and more particularly to air brake controls for railroad trains.

Among the objects of this invention is to provide a braking system which is smooth in application and release, and also fully and accurately responsive to regulation by the engineer.

Another object is to enable uniform reduction of air pressure throughout the entire length of the brake pipe so as to accomplish uniform brake application for every car throughout the full length of the train.

Another object is to render the brake pipe air pressure reduction and the accompanying brake application proportional to the distance that the manual control handle is moved from its "running" position.

Another object is to automatically cut off the escape of air from the brake pipe to the atmosphere when the brake pipe pressure falls to the point corresponding to the setting of the manual control handle.

Another object is to supply air to the brake pipe to replace that lost by leakage throughout its length so as to maintain it exactly at the pressure for which the control handle is set.

Another object is to maintain the normal pressure differential throughout the length of the brake pipe during the braking operation.

Another object is to render all brakes on even long trains responsive to brake pipe pressure reductions as low as seven pounds.

Another object is to safeguard against overcharging the brake pipe when releasing the brakes.

Another object is to maintain the main reservoir at high pressure throughout the operation of the charging of the brake pipe.

Another object is to simplify the graduated brake release for passenger trains.

Other objects and advantages appear as this description progresses.

In this specification and the accompanying drawings, the invention is disclosed in its preferred form. It is to be understood, however, that it is not limited to this form because it may be embodied in other forms without departing from the spirit of the invention as defined by the claims following the description.

In the accompanying seven sheets of drawings:

Figs. 10 to 13, inclusive, are diagrammatic views showing the control apparatus in the several phases of its operation. The parts and proportions in these figures have been arranged so as to illustrate the mode of operation with maximum clearness rather than to strictly adhere to the true mechanical structure. It is deemed that details of construction are sufficiently illustrated in Figs. 1 to 8.

Fig. 11 shows the rotary control valve in "running" position and the brake pipe being charged from the main reservoir subsequent to a pressure reduction in the brake pipe.

Figure 1:
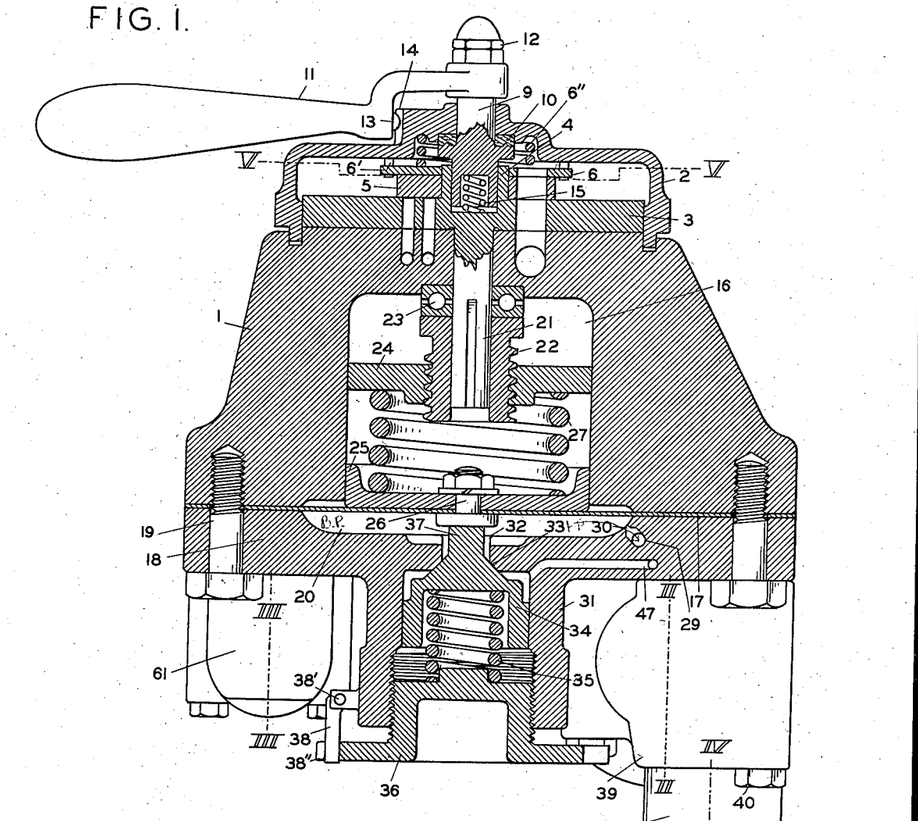
Fig. 1 is a vertical section of an air brake control assembly constructed in accordance with this invention.

In detail the construction illustrated in the drawings, referring more particularly to Fig. 1, comprises the valve body 1 having the cover 2 fixed thereon by suitable bolts. The rotary valve block 3 is rotatable within the cover 2 in contact with the smooth surface of the valve body 1. The valve block 3 has the neck 4 extending upwardly therefrom to form a pivot for the follower valve 5 which operatively engages the top surface of the valve block 3. The valve block 3 has the pins 7—7 (see Fig. 5) which are confined within the arcuate slot 8—8 in the follower valve 5. These slots provide for limited freedom of movement between the follower valve 5 and the rotary valve 3.

The movement of the follower valve 5 is retarded with respect to the movement of the rotary valve 3 by the friction plate 6 which is held against rotary movement by the studs 6' fixed in the cover 2. The spring 6'' urges the friction plate 6 into firm engagement with the follower valve 5.

The valve body 1, the rotary valve 3, and the follower valve 5 are provided with cooperating ports and cavities which control the operation of the brake control system as hereinafter described.

The stem 9 is splined within the neck 4 of the rotary valve block and extends upward through the cover 2. The spring 15 expanding between the end of the stem 9 and the rotary valve block 3 maintains the valve block firmly seated against the top of the body 1. The packing 10 seals the stem 9 against leakage therepast. The manual control handle 11 is fixed on the end of the stem 9 by means of the nut 12. The handle 11 has the yielding pawl 13 therein which is engageable in notches such as 14 in the cover 2 to expedite the movement of the control handle to the several operative positions thereof.

The valve body 1 has the central chamber 16 therein. The soft metal diaphragm 17 closes the bottom of the central chamber 16 and has its margins clamped against the valve block body 1 by the base 18 which is secured to the body 1 by the bolts 19. The base 18 has the recess 20 therein to permit the yielding of the diaphragm 17 responsive to variations in the pressures exerted thereagainst. The valve block 3 has the shaft 21 extending downward therefrom into the chamber 16. The worm 22 is splined on the lower end of the shaft 21 and engages the plunger 24. The thrust bearing 23 is arranged to receive the upward thrust of the worm 22. The cup 25 is slidable in the chamber 16 and is bolted to the diaphragm 17 at 26. The expansion spring 27 is interposed between the plunger 24 and the cup 25. It is calibrated accurately to exert a predetermined thrust for a given distance of compression.

The rotation of the worm 22 by the operation of the control handle 11 imposes predetermined variations in the thrusts against the diaphragm 17. The recess 20 communicates with the brake pipe 28 through the passage 29 having the restriction 30 therein. The brake pipe pressure is thus exerted against one side of the diaphragm 17 while the thrust of the spring 27 is exerted against the opposite side. The restriction 30 precludes transient variations of pressure in the brake pipe at this point from affecting the pressure in the recess 20 and operating the diaphragm.

The base 18 has the neck 31 extending downwardly therefrom and having the opening 32 therethrough communicating with the recess 20. The annular valve seat 33 is provided in the neck 31 at the entrance of the opening 32. The valve 34 is slidable within the neck 31 and is adapted to seat at 33. The spring 35 expands between the manually adjustable plug 36 and the valve 34 and is arranged to urge the valve upwardly into seated position.

The valve 34 has the head 37 which abuts the head of the bolt 26 so that downward movement of the diaphragm 17 is transmitted to the valve 34. Thus diminution of the brake pipe pressure existing in the recess 20 allows the spring 27 to bulge the diaphragm 17 downward to unseat the valve 34. The effective thrust of the spring 27 against the diaphragm 17 can be increased or decreased by decreasing or increasing respectively the tension of the spring 35 by means of the adjusting plug 36. The latch 38 is pivoted on the lug 38' and is engageable in the slots 38'' to lock the plug 36 in adjusted position.

The control valve body 39 is fixed beneath the base 18 by means of the bolts 40. It has the piston chamber 41 (see Fig. 2) which is closed by the plate 42. The piston 43 is fixed on the stem 44 by means of the nut 45 and is slidable within the piston chamber 41. The cup leather 46 seals the piston against air leakage.

Figure 2:
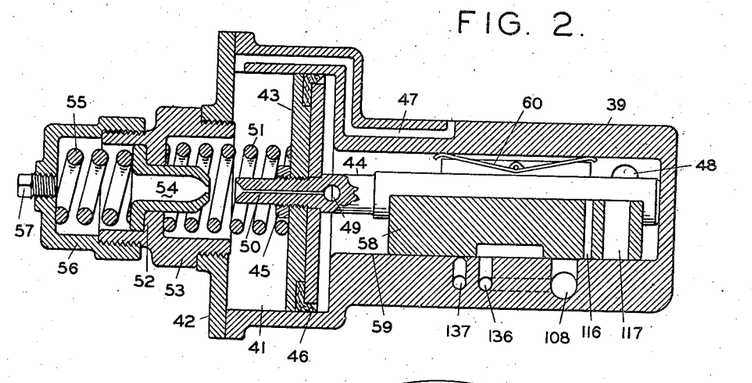
Fig. 2 is a vertical section taken along the line II—II in Fig. 1 showing the control slide valve.
Figure 2:
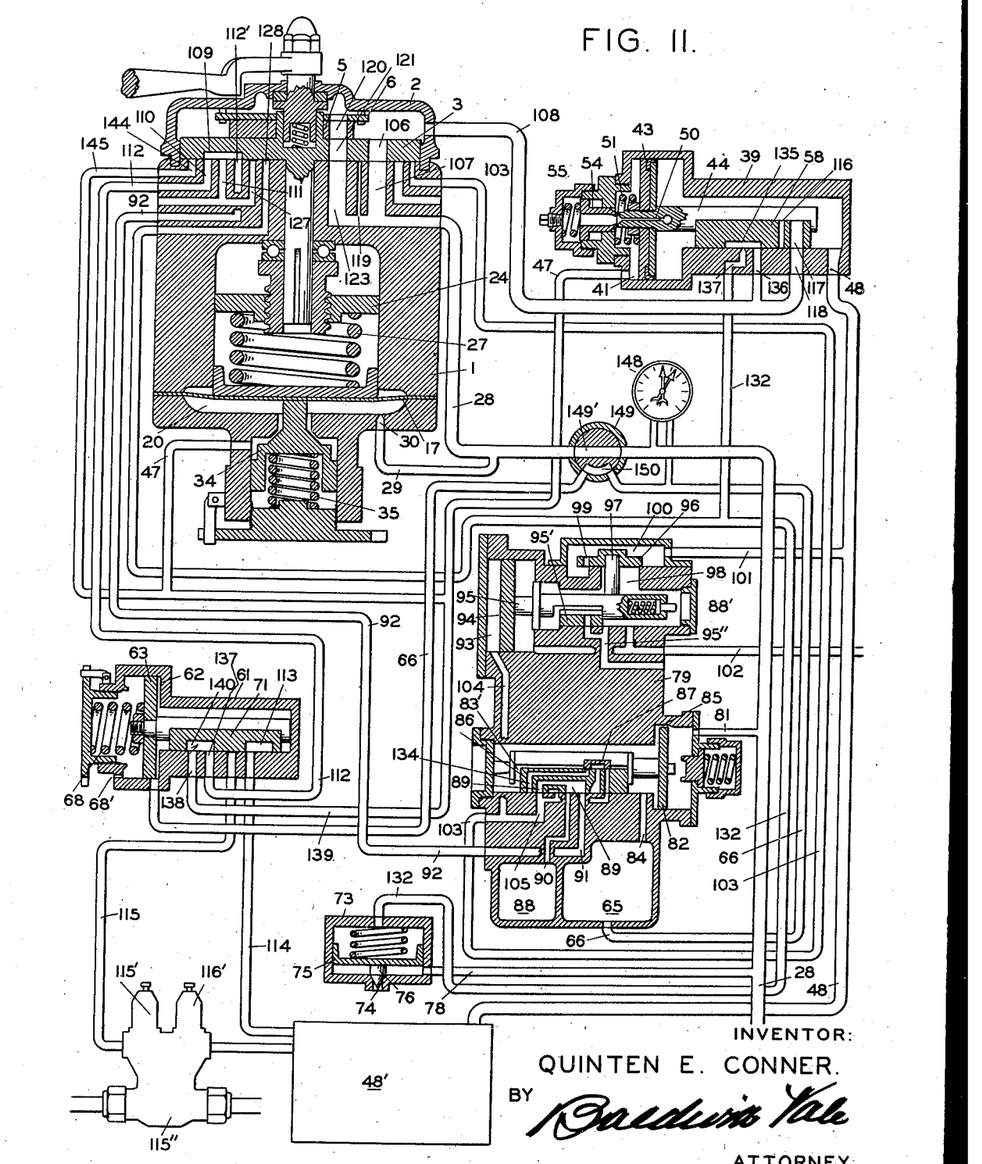

The piston chamber 41 is connected through the passage 47 with the valve chamber within the neck 31. The piston chamber 41 then communicates with the brake pipe 28 through the recess 20 whenever the valve 33 is opened. The passage 48 communicates with the main pressure reservoir 48' (see Fig. 11) of the locomotive and admits main reservoir pressure to the control valve body 39. This pressure is exerted against the right hand side of the piston 43. The stem 44 has the transverse opening 49 therethrough with the axial choke passage 50 leading therefrom and discharging into the piston chamber 41. This choke passage 50 permits main reservoir pressure to be slowly built up within the chamber 41.

The spring 51 expands between the piston 43 and the shoulder 52 of the sleeve 53 which is screwed into the plate 42. The expansion of the spring 51 urges the piston 43 into the position shown in Fig. 2. The yieldable stop 54 engages the shoulder 52 and extends into the piston chamber 41. It is backed up by the graduating spring 55 which expands against the enclosing cover 56 which is threaded on the sleeve 53.

After the piston makes a limited movement toward the left, the end of the stem 44 engages the yielding stop 54. Any continued movement of the piston 43 then requires simultaneous compression of the spring 51 and 55. The tension of the springs 51 and 55 are arranged so that when the pressure in the piston chamber 41 is reduced to brake pipe pressure by the unseating of the valve 33, the piston 43 will move only until the stem 44 engages the stop 54. Further movement of the piston 43 which necessitates the compression of both the springs 51 and 55 will only be executed when the pressure in the piston chamber 41 is reduced to atmospheric.

The cover 56 is provided within the plug 57. This enables the insertion of a suitable cleaning instrument through the hollow stop 54 into the choke passage 50 to remove accumulations of dirt therefrom.

The stem 44 has the slide valve 58 fixed thereto which engages the smooth interior surface 59 of the valve body 39. The slide valve 58 is provided with cavities and ports, later to be described in detail, which cooperate with ports in the portion 59 of the valve body. The spring 60 urges the slide valve 58 into firm contact with the surface 59.

Figure 3:
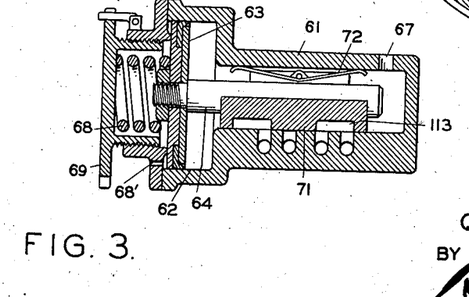
Fig. 3 is a similar view taken along the line III—III in Fig. 1 showing the charging valve.

The charging valve body 61 is bolted to the base 18 opposite the control valve 39 and has the piston chamber 62 therein, see Fig. 3. The piston 63 is slidable in the chamber 62 and has the stem 64 attached thereto. Pressure from the pressure chamber 65 of the distributing valve (refer to Fig. 10) is admitted to the chamber 62 by the pipe 66 connected to the port 67. This pressure is exerted against the right hand side of the piston 63. It is balanced by the spring 68 which expands between the piston 63 and the manually adjustable cup 69 which is threaded in the body 61. The port 68' maintains atmospheric pressure in the left hand side of the piston chamber 62. Adjustment of the cup 69 regulates the tension of the spring 68 and predetermines the air pressure in the chamber at which the operative movement of the piston 63 will take place.

The slide valve 71 is attached to the stem 64 and has cavities therein which cooperate with the ports in the body 61 to regulate the charging of the system as will be later described. The spring 72 expands against the interior of the body 61 and urges the slide valve 71 to firm engagement with the interior surface of the body 61.

Figure 4:
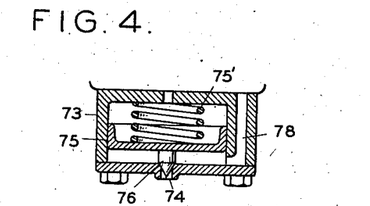
Fig. 4 is a similar view taken along the line IV—IV in Fig. 1 showing the brake pipe pressure reduction valve.

The brake pipe reduction valve chamber 73 is bolted to the control valve body 39. The chamber 73 has the outlet 74 (see Fig. 4) discharging into the atmosphere. The piston 75 is slidable within the chamber 73 and has the valve 76 fixed thereto which is adapted to seat in the discharge outlet 74. The spring 75' expands against the piston 75 to urge the valve 76 into seated position closing the outlet 74. The passage 78 communicates with the brake pipe 28 and admits brake pipe air into the chamber 73 beneath the piston 75. Air pressure is normally maintained, as later described, above the piston 75 to overbalance the brake pipe pressure on its opposite side. This normally maintains the valve 76 seated against the escape of brake pipe air.

Figure 10:
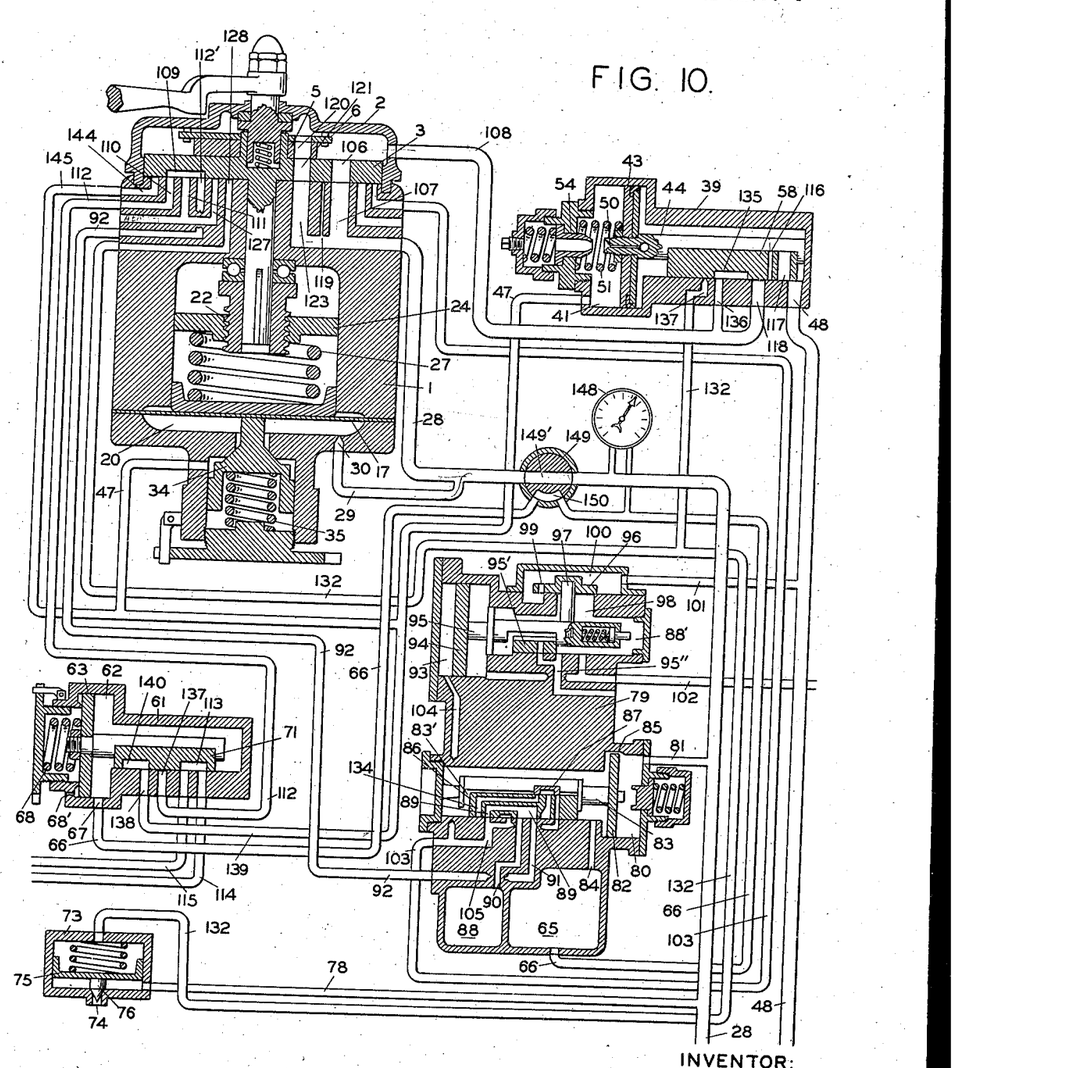
Fig. 10 shows the rotary control valve in "running" position and the brake pipe fully charged and cut off from communication with the main reservoir. This is the normal condition of the brake system.

The brake control apparatus provided in accordance with this invention operates in conjunction with a conventional distributing valve. Fig. 10 illustrates a No. 6-E distributing valve manufactured by the Westinghouse Air Brake Company. This particular type or make of distributing valve is not essential to the operation of the present invention. Other types such as the No. 8-A manufactured by the same company can be used with equal success.

It is deemed sufficient to describe only the main essentials of a conventional distributing valve which are necessary for understanding of its cooperation with the present control system. Reference may be had to the instruction pamphlets No. 5032 and 5032-1 published by the Westinghouse Air Brake Company for a more complete detailed description of the construction and operation of conventional distributing valves.

The structure illustrated in Fig. 10 comprises, in detail, the body 79 with the equalizing piston chamber 80 therein. The brake pipe is connected with the right hand side of this chamber by the branch pipe 81. The equalizing piston 82 is slidable in the chamber 80 and has the stem 83 attached thereto. The pressure chamber 65 communicates with the left hand side of the piston chamber 80 through the passage 84. When the piston 82 is in normal position, the feed groove 85 in the chamber 80 permits restricted flow of brake pipe air therepast into the pressure chamber.

The valve stem 83 loosely engages the slide valve 86 with slack provided at 83'. The slide valve 86 has ports and cavities therein which cooperate with ports in the valve body 79. The slide valve 87 is fixed in the stem 83 and cooperates with ports in the slide valve 86. There is relative movement between the slide valve 87 and the slide valve 86 enabled by the slack at 83'.

The application chamber 88 has the port 90 cooperating with the cavity 89 in the slide valve 86. The passage 91 also cooperates with this cavity and is connected to the distributing valve release pipe 92. This pipe normally discharges into the atmosphere through the rotary control valve. The application chamber is thus normally maintained at atmospheric pressure.

The application piston chamber 93 is provided in the upper portion of the distributing valve body 79. It has the application piston 94 slidable therein and having the stem 95. The slide valve chamber 100 is connected to the main pressure reservoir by the branch pipe 101. The application piston chamber 93 has the port 98 communicating with the slide valve chamber 100. The pipe 102 connects the application piston chamber with the brake cylinders (not shown) of the locomotive and tender.

The slide valve 95' is engaged by the stem 95 and cooperates with the ports 95" in the body 79 discharging into the atmosphere. In the normal "running" operation of the brake system, the port 95" remains uncovered by the slide valve 95'. The locomotive brake cylinders are then maintained at atmospheric pressure by the communication therewith through the pipe 102, the chamber 88', and the port 95".

The application slide valve 96 in the chamber 100 is connected to the stem 95 by the pin 97 and normally closes the port 98. The slide valve 96 has the port 99 therethrough which is adapted to register with the port 98 during a service application.

The left hand side of the application piston chamber is connected to the application cylinder pipe 103 through the passage 104. The passage 104 also communicates with the port 105 which cooperates with the slide valve 85 as later described.

The invention operates substantially as follows: In the "running" position of the rotary control valve (see Figs. 10 and 5) the port 106 registers with the port 107 through the rotary valve block 3 in the body 1 which communicates with the brake pipe 28. The port 106 communicates through the interior of the cover 2 with the passage 108 which leads to the control slide valve 39. The cavity 109 in the rotary valve 3 connects the port 110 to the port 111 which discharges to the atmosphere.

Figures 5, 9:
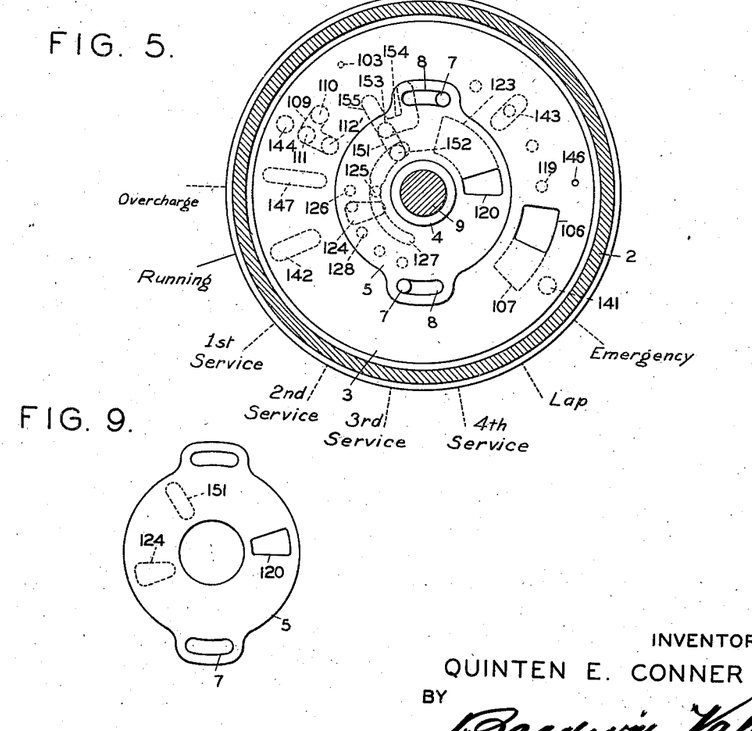
Fig. 5 is a horizontal section taken along the line V—V in Fig. 1 showing the manually controlled rotary valve in "running" position.
Fig. 9 is a similar view of the follower rotary valve block.

The passage 112 leads from the port 110 to the charging valve 61. The port 112', communicating with the distributing valve release pipe 92, is similarly connected to the exhaust port 111 by the cavity 109.

The piston chamber 62 is connected to the pressure chamber 65 as previously described in the description of the construction of the system. Atmospheric pressure admitted through port 68' is applied against the opposite side of the piston 63. The spring 68 counterbalances the pressure chamber pressure on the opposite side of the piston 63.

When the brake system is in the normal "running" condition the pressure chamber 65 communicates with the brake pipe 28 through the passage 84, past the piston 82 over the feed groove 85, and through the branch pipe 81. The pressure chamber pressure thus slowly rises to the brake pipe pressure. For freight service the brake pipe is usually maintained at eighty pounds gauge pressure when the brake system is in normal "running" condition. A higher pressure, usually ninety pounds, is used for passenger service.

When the pressure chamber pressure approaches to within five pounds of the predetermined normal for the brake pipe, the piston 63 and its attached slide valve 71 move to the left into the positions shown in Fig. 10. In this position the cavity 113 connects the main reservoir pipe 114 with the pipe 115 which leads to the low pressure head 115' of the compressor governor 115'' (see Fig. 11). The pressure in the main reservoir is then maintained at the pressure for which the low pressure head is set.

The diaphragm recess 20 is connected, through the choke 30 and the passage 29 to the brake pipe 28. The calibrated spring 27 expands against the diaphragm 17. When the rotary valve is in "running" position the spring 27 is compressed by the worm 22 so as to exert a thrust on the diaphragm 17 which will counterbalance a pressure slightly less than eighty pounds per square inch on its opposite side. When the brake pipe pressure is at the prescribed normal of eighty pounds, the pressure in the diaphragm recess 20 raises the diaphragm and allows the spring 35 to seat the valve 34. This cuts off the passage 47, which leads to the piston chamber 41, from communication with the brake pipe 28. The chamber 41 being completely closed, the air flowing through the choke 50 from the main reservoir port 48 raises the pressure in the chamber 41 until the pressure on its opposite sides become equal. The spring 51 then moves the piston 43 and its attached slide valve 58 to the right. This moves the ports 116 and 117 in the slide valve out of registry with the port 118 in the valve body which connects with the passage 108 leading to the interior of the rotary valve cover 2. The brake pipe 28 is thus cut off from communication with the main reservoir so long as its pressure remains at eighty pounds.

The pressure in the brake pipe gradually diminishes due to the inevitable slow leaks in the system. When the pressure in the diaphragm recess 20 sinks to a pound or so less than the prescribed brake pipe normal pressure, the spring 27 overbalances the diminished pressure against the diaphragm 17 and unseats the valve 34. The piston chamber 41 then communicates with the brake pipe 28 through the passage 47, the unseated valve 34 and the passage 29. The chamber 41 has been maintained at the main reservoir pressure which is approximately one hundred and ten pounds by the choke 50. Air consequently flows therefrom into the brake pipe which is at a pressure of less than eighty pounds. The choke 50 being restricted, the main reservoir air flows slowly into the chamber 41 and does not interfere with the pressure drop produced by the air flowing more rapidly from the chamber 41 into the brake pipe 28.

Figure 13:
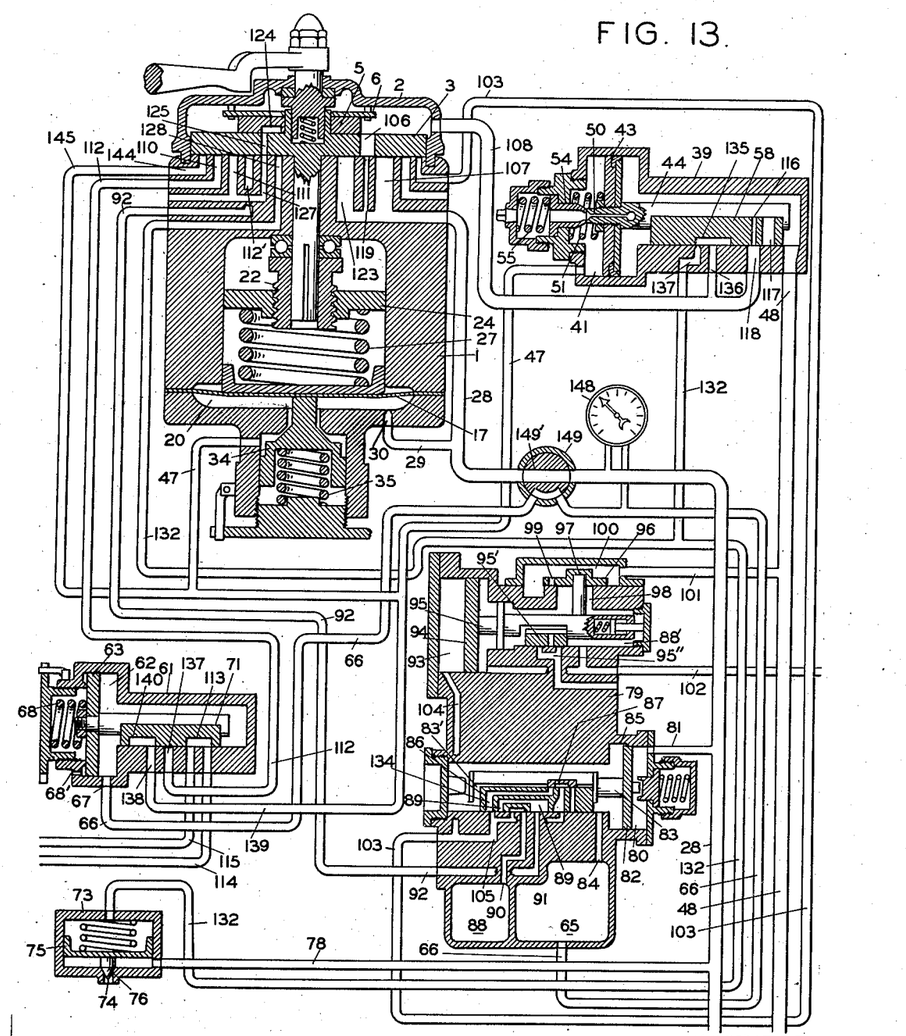
Fig. 13 shows the rotary valve in a "service" position and the brake pipe exhaust valve closed.

The decrease in pressure in the chamber 41 allows the piston 43 and its attached slide valve 58 to move to the left until the end of the stem 44 contacts the stop 54 as shown in Fig. 13. In this position the restricted port 116 registers with the port 118 of the passage 108. Air then flows from the main reservoir to the brake pipe 28 through the passage 108 and the rotary valve block 3.

When the pressure in the brake pipe 28 and the recess 20 rises to eighty pounds, the pressure on the diaphragm 17 over balances the spring 27 and seats the valve 34. This closes the chamber 41 from communication with the brake pipe. Air entering the chamber 41 through the choke 50 then raises the pressure therein. When the pressures on the opposite sides of the piston 43 approach equality, the spring 51 moves the piston and the slide valve 58 to the left cutting off the main reservoir port 116 from the port 118 connected to the brake pipe.

To apply the brakes the control handle of the rotary valve is moved into any one of several "service" positions which correspond to predetermined pressure reductions in the brake pipe. It is required in practice to first make a small pressure reduction before reducing the pressure sufficiently to more fully apply the brakes. The first pressure reduction enables the mechanical slack in the brake system to be taken up so that the succeeding brake operation can be more accurately controlled.

During the normal "running" operation of the brake system there is an inevitable differential between the pressures at the front and rear ends of the brake pipe. Unavoidable leaks in the brake pipe system and its couplings prevent the pressure, which is uniformly maintained at the front end of the brake pipe, from being transmitted to the rear end of the brake pipe. This is particularly noticeable in the case of long trains which may often number one hundred cars or more. There may be a pressure difference of ten or more pounds between the front and rear ends of the brake pipe.

One of the principal advantages of the present invention is that it enables this brake pipe pressure differential to be continued during the braking operation. This is accomplished by maintaining the front end of the brake pipe at a constant pressure after the brake pipe pressure reduction. This is effected by admitting air into the front end of the brake pipe whenever it falls below the predetermined reduced pressure. The pressure difference between the front and rear of the brake pipe is then produced by the leaks in the system as in the "running" operation. There is thus a uniform reduction of pressure at every point throughout the length of the brake pipe.

Under prior practice, it was not possible to maintain the front end of the brake pipe at a uniform pressure after an operative pressure reduction. The pressure in the brake pipe thus equalized itself throughout its length. The equalized reduced pressure throughout the length of the brake pipe obviously represented a varied pressure reduction at different points in the brake pipe. This resulted in irregularity in brake application throughout the length of the train often leading to disastrous consequences.

In bringing the rotary valve 3 into the first "service" position it is first moved into an intermediate position. This moves the cavity 109 out of communication with the exhaust port 111, see Figs. 6 and 12.

Figure 6:
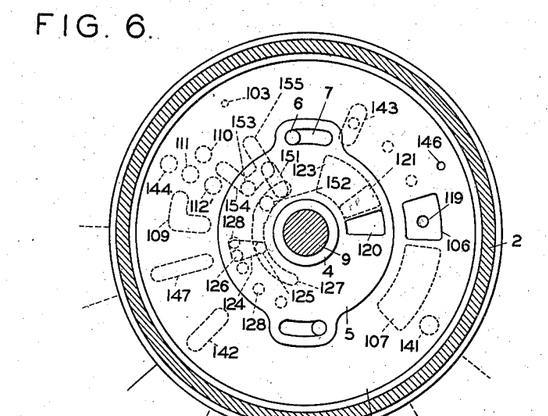
Fig. 6 is a similar view of the same in the first "service" position.
Figure 12:
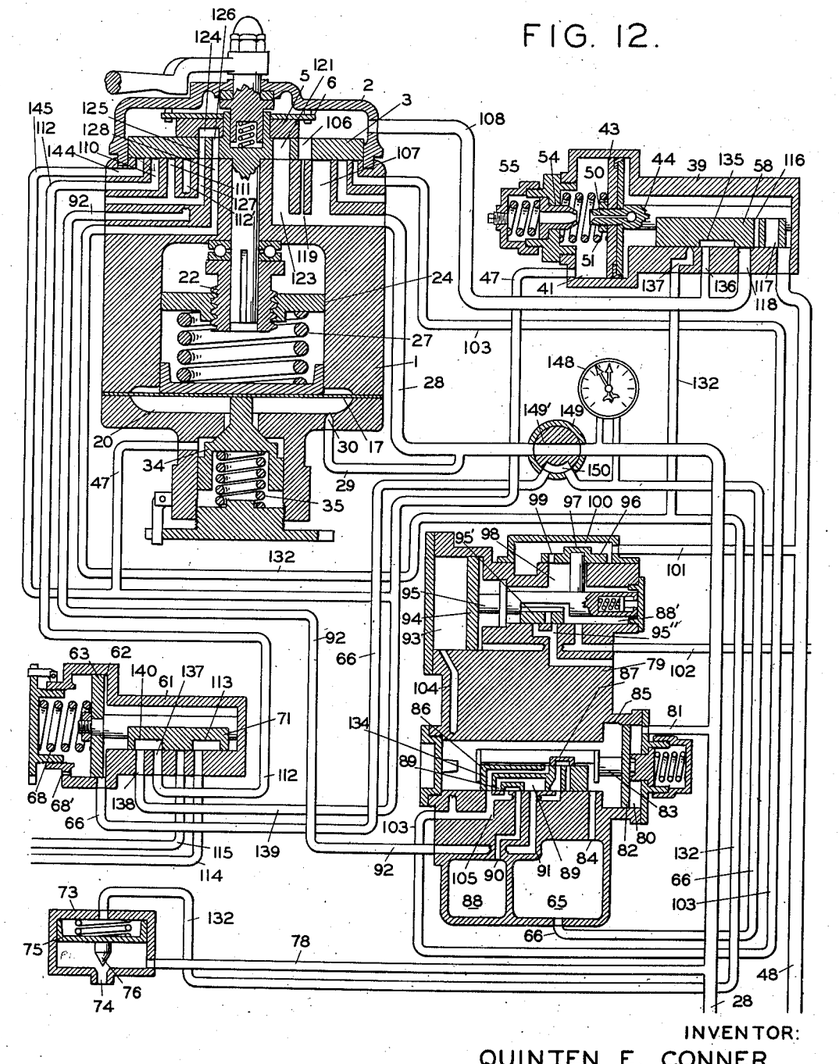
Fig. 12 shows the rotary control valve intermediate the "running" and a "service" position and the brake pipe exhaust valve open to effect a brake service reduction.

The port 106 moves out of registry with the port 107 and registers with the restricted port 119 which also leads to the brake pipe 28.

The follower valve is held against movement by the friction plate 6 and assumes the position shown in Fig. 6 with respect to the rotary valve block 3. In this position the port 120 through the follower valve is out of registry with the port 121 which is in continuous alinement with the arcuate port 123 in the body 1 leading to the brake pipe 28. The interior of the cover 2 then has communication with the brake pipe only through the restricted port 119.

The relative movement between the rotary valve block 3 and the follower valve 5 also removes the cavity 151 in the valve 5, from registry with the ports 152, 153 provided through the valve block 3. The function of these ports will be later described. They remain inoperative during the usual braking operation.

The relative movement between the rotary valve block 3 and the follower valve 5 also results in the cavity 124 in the follower valve moving into registry with the ports 125 and 126 in the valve block. The port 125 is in continuous communication with the arcuate port 127 in the valve body 1 leading to the atmosphere. In the intermediate position of the rotary valve between the "running" and the first "service" positions, the port 126 in the rotary valve block 3 registers with the port 128 in the valve body. This port communicates through the passage 132 with the interior of the chamber 73 above the piston 75.

The chamber 73 above the piston 75 is quickly reduced to atmospheric pressure by the air therein flowing through the passage 132, and the ports 128, 126, 125 to the exhaust port 127.

Brake pipe pressure is exerted against the underside of the piston 75 in the valve chamber 73, being admitted through the passage 78 as previously described. This pressure unseats the valve 76 and air from the brake pipe 28 is allowed to escape into the atmosphere through the outlet 74. The consequent initial reduction of pressure in the brake pipe enables the triple valves on each of the cars to perform a quick service operation. This partially applies the brakes. The air flowing through the outlet 74 produces a hissing sound which continues as long as the brake pipe pressure is being reduced. This serves as a warning in the event that the valve 76 fails to seat after the proper reduction has been made.

The movement of the rotary valve block 3 also moves the cavity 109 out of registry with the ports 110, 111 and 112'. This cuts off the exhaust port 111 from communication with the port 110 having the passage 112 leading therefrom to the charging valve 61. The port 112' communicating with the distributing valve release pipe 92 is similarly cut off from the exhaust port 111.

The reduction of the pressure in the brake pipe 28 also reduces the pressure in the right hand side of the equalizing piston chamber 80.

The left hand side of this chamber communicates with the pressure chamber 65 which has been maintained at the normal brake pipe pressure of 80 pounds. The difference in pressure on the two sides of the equalizing piston 82 results in the piston moving toward the right as shown in Fig. 12. The first movement of the piston closes the feed groove 85 cutting off the pressure chamber 65 from communication with the brake pipe 28. The preliminary portion of the movement of the piston 82 uncovers the passage 134 in the slide valve 87.

The continued movement of the piston 82 to the right moves the lower end of the passage 134 into registry with the port 105. This port communicates through the passage 104 to the left hand side of the application piston chamber 93. Air then flows from the pressure chamber 65 through the passage 84, the passage 134 and the passage 104 to the application piston chamber. This moves the application piston 94 to the right against the atmospheric pressure on its opposite side. This moves the slide valve 95' to cover the port 95'' cutting off communication between the right hand side 88' of the application chamber and the atmosphere. The movement of the piston 94 also moves the application slide valve 96 into operative position with the port 99 registering with the port 98. Air at main reservoir pressure then flows from the application slide valve chamber 100 through the ports 99, 98 to the locomotive brake cylinders through the pipe 102.

The pressure in the pressure chamber 65 is reduced by the air therefrom flowing into the application chamber 88 and to the application piston chamber 93 as previously described. The decrease in pressure chamber pressure is transmitted to the right hand side of the charging valve chamber 62 by the pipe 66. The expansion of the spring 68 moves the piston 63 to the right into the position shown in Fig. 12. This moves the cavity 113 in the slide valve 71 out of registry with the pipe 115 thus cutting off the low pressure head 115' of the compressor governor 115'' (see Fig. 11) from the main reservoir pipe 114. This cuts out the low pressure head from operative control of the compressor governor. The high pressure head 116' of the governor then becomes operative. The compressor then raises the pressure in the main reservoir to approximately 125 pounds. This anticipates the drain on the main reservoir in raising the pressure in the brake pipe 28 to release the brakes and to fully recharge the equipment.

The rotary valve remains in the intermediate position long enough to permit the compressed air above the piston 75 to escape into the atmosphere. This is practically instantaneous, and the time required is left to the judgment of the operator. The rotary valve is then moved into the first service position.

When the rotary valve arrives in the service position (see Figs. 5 and 13) the port 126 moves out of registry with the port 128. This cuts off the chamber 73 from communication with the atmosphere. The port 106 remains in communication with the brake pipe through the restricted port 119. In the first "service" position the spring 27 preferably exerts a thrust counterbalancing a pressure of seventy-three pounds on the opposite side of the diaphragm 17. This corresponds to a pressure reduction of seven pounds.

When sufficient air has escaped from the brake pipe through the outlet 74 to lower its pressure to slightly less than seventy-three pounds the spring 27 overbalances the reduced pressure in the recess 20 and unseats the valve 34. This allows air to escape from the piston chamber 41 into the brake pipe 28. The piston 43 then moves the slide valve 58 to the right until the end of the stem 44 engages the stop 54 as shown in Fig. 13.

In this position the cavity 135 passes air at brake pipe pressure from the port 136 which communicates with the passage 108 into the restricted port 137 which leads to the pipe 132. The air flowing therethrough slowly raises the chamber 73 above the piston 75 to brake pipe pressure. This seats the valve 76 to stop the escape of the air from the brake pipe through the outlet 74. Abrupt closing of the valve 76 is avoided in order to preclude a transient rise in pressure in the head end of the brake pipe due to the momentum of the air flowing therethrough during the closing operation of the valve 76.

Air flows from the main reservoir through the port 116 and the passage 108 into the brake pipe 28. This replaces the air lost from the brake pipe due to the slow closing of the valve 76. It also operates as a retardent to the velocity of the air flowing to the head end of the brake pipe.

Any raise in brake pipe pressure slightly above the setting of the control handle will raise the piston 75 and open the valve 76. The excess pressure will then escape into the atmosphere through the outlet 74.

When the brake pipe pressure rises slightly to almost seventy-three pounds the increased pressure in the recess 20 will raise the diaphragm to allow the piston 30 to seat. The pressure in the piston chamber 41 is then raised by the main reservoir air flowing through the choke 50. This piston 43 and the slide valve 58 then move to the right. This cuts off the main reservoir port 116 from communication with the brake pipe line 108.

Whenever the brake pipe pressure falls to below seventy-three pounds due to leaks therein the valve 34 is unseated by expansion of the diaphragm 17 against the reduced pressure in the recess 20. This causes the piston 43 and the slide valve 58 to move to the left into the position shown in Fig. 13, as previously described. The brake pipe pressure is raised by main reservoir air flowing through the port 116. The port 116 is cut off when the brake pipe pressure reaches the predetermined point as above described. The restricted port 119 permits only relatively slow flow of air to the brake pipe. This is sufficient to replace the air lost by leaks and avoids any undue rise in pressure at the front end of the brake pipe which might cause some of the brakes to release.

The triple valves and the brake cylinders controlled by the brake pipe are any of the usual Westinghouse types, the construction and operation of which are conventional. The reduction in brake pipe pressure of seven pounds is sufficient to operate the brakes to the extent that the mechanical slack is taken out of the brake linkage and the brake shoes are lightly applied to the wheels. The stabilizing of the brake pipe pressure after the reduction thereof enables the triple valves to lap themselves.

The preferred practice is to allow the rotary valve to remain in the first "service" position for some little time, the duration of which is determined by the length of the train. This allows sufficient time for mechanical slack in the brakes to be uniformly taken up throughout the length of the train.

After the brakes are thus uniformly and partially applied, the rotary valve may be moved to one of the succeeding service positions, the selection of which will be determined by conditions. When the rotary valve occupies a position intermediate two service positions, the apparatus assumes the operative positions shown in Fig. 12. The operation is analogous to that described when the rotary valve was moved toward the first service position. When the rotary valve arrives in the selected service position, the parts assume the positions shown in Fig. 13. The tension on the spring 27 is lightened in proportion to the distance that the rotary valve is moved.

While the rotary valve occupies a position intermediate "service" position, the passage 132 is connected to the port 127 by the cavity 124. This again brings the chamber 73 down to atmospheric pressure and allows air to escape from the brake pipe 28 through the outlet 74. When the brake pipe 28 reaches the pressure corresponding to the setting of the rotary valve, the operation of the diaphragm 17 and the piston 43 re-establishes brake pipe pressure in the chamber 73 and closes the outlet 74.

When the rotary valve is moved into a "service" position the port 126 is out of registry with any of the ports 128. This prevents the air in the chamber 73 from escaping when the slide valve 43 returns to its right hand position, as shown in Fig. 13, when the diaphragm valve 34 closes. The brake pipe pressure is then maintained again against leakage by the operation of the diaphragm 17 and the opening and closing of the valve 34, as previously described.

To accomplish full release of the brakes, the rotary valve is simply returned to "running" position, see Fig. 11. In this position the distributing valve release pipe 92 has its port 112' connected to the exhaust port 111 by the cavity 109. This releases the brakes controlled by the distributing valve.

The cavity 109 also connects the port 110 to the port 111. The passage 112 leads from the port 110 and terminates in the port 137 co-operating with the slide valve 71 of the charging valve 61. The port 138 is located in the valve 71 alongside the port 137 and communicates with the left hand side of the control slide valve chamber 41 through the passage 139.

The pressure chamber 65 is connected to the charging valve piston chamber 62 by the pipe 66. So long as the pressure chamber pressure remains below that of the prescribed normal brake pipe pressure, say eighty pounds, the slide valve 71 occupies a position to the right as is shown in Fig. 11. In this position the cavity 140 provides communication between the ports 137 and 138. This allows the compressed air in the chamber 41 to flow to the atmosphere through the passages 139 and 112, the cavity 109 and the port 111. The main reservoir pressure acting on the opposite side of the piston 43 moves the piston and its attached slide valve 43 to the extreme left against the pressure of both the spring 51 and the spring 55 into the position shown in Fig. 11. The unrestricted port 117 in the valve 58 then registers with the port 118. Air from the main reservoir then flows rapidly through the port 116, the passage 108, the rotary valve cover 2, and the ports 106 and 107 to the brake pipe 28 to raise the pressure therein.

The rise in pressure in the brake pipe is accompanied by a delayed rise in pressure in the pressure chamber 65 which is slowly charged from the brake pipe through the restricted feed groove 85. This rise in pressure is communicated to the chamber 62 and moves the piston 63 to the left into the position shown in Fig. 10 when the pressure chamber pressure rises to near its normal "running" pressure.

This movement of the slide valve 71 cuts off the chamber 41 from communication with the atmosphere through the port 111. The pressure on both sides of the piston 43 is then equalized by the air flowing through the choke 50. The piston 43 then moves to the right into the position shown in Fig. 10 cutting off the supply of main reservoir air through either of the ports 116 or 117 to the brake pipe 28. The pressure in the brake pipe is then maintained at the normal as previously described.

It is to be noted that the cavity 113 remains out of registry with the pipe 115 until the charging valve piston 63 is restored to the left as in Fig. 10 at the end of the charging operation. The low pressure head 115' of the compressor governor 115'' thus remains out of communication with the main reservoir 48' during the charging operation. The main reservoir is consequently maintained at high pressure by the high pressure head 116' of the pressure governor throughout the charging operation. In the conventional equipment the low pressure head of the compressor governor becomes operative as soon as the charging operation commences.

For passenger train service, the present control equipment will perform a graduated release of the brakes. This is important so that the pressure of the brake shoes may be lessened just before the train comes to a stop so as to avoid an abrupt halt. It is also a desirable operation for releasing the brakes when the train is rolling at a low rate of speed.

The graduated release is accomplished by moving the rotary valve toward the "running" position into one of the intermediate service positions. The movement of the rotary valve increases the thrust of the spring 27 against the diaphragm 17 a predetermined amount depending upon the distance that the rotary valve is moved. The increased spring pressure unseats the valve 34 permitting the air under pressure in the chamber 41 to flow to the brake pipe through the unseated valve. The decrease in pressure in the chamber 41 allows the piston 43 to move to the left. The pressure in the brake pipe is then raised by main reservoir air flowing through the port 116. When the pressure in the brake pipe reaches a pressure equivalent to the thrust of the spring 27, the valve 34 is seated and the port 116 is consequently moved out of communication with the brake pipe by the operation of the piston 43. The brake pipe pressure is then maintained equivalent to the thrust of the spring 27 as previously described.

The friction plate 6 causes the follower valve 5 to lag behind the movement of the rotary valve 3 toward "release" position. This removes the cavity 124 in the follower valve 5, from registry with the port 125 in the rotary valve 3, refer to Fig. 5. This prevents air from escaping from the chamber 73 above the piston 75 through the passages 132, and 129, the ports and cavity 128, 126, 124, 127 to the atmosphere when the rotary valve is intermediate two "service" positions. This maintains the brake pipe pressure reduction valve 76 closed throughout the release operation.

The relative movement between the rotary valve block 3 and the follower valve 5 brings the cavity 151 in the valve 5 into registry with the ports 152, 153 in the valve block 3. The port 152 is in continuous communication with the atmosphere through the arcuate port 127. The port 153 leads to the cavity 154 which has the radial extensions 155—155. These extensions are arranged to register with the port 112′ when the rotary valve is intermediate two "service" positions.

Thus when the rotary valve is being moved toward "running" position, a quantity of air is allowed to escape from the application piston chamber 93 into the atmosphere. This air flows through the pipe 92, the port 112′, the cavity 154, the port 153, the cavity 151, the port 152, to the atmospheric port 127. This escape of air partially releases the brakes on the locomotive. When the rotary valve arrives in a "service" position, the extension 155 of the cavity 154 passes out of registry with the port 112′. The application piston chamber is thus cut off from the atmosphere and the locomotive brakes maintained in partially released condition until the rotary valve is again operated.

The relative movement between the rotary valve block 3 and the follower valve 5 also moves the port 120 into registry with the port 121, compare Figs. 6 and 5. This allows free flow of air from the interior of the cover 2 into the brake pipe 28 through the alined ports 120, 121, 123 independent of the restricted flow through the port 119. Rapid charging of the brake pipe 28 through the rotary valve is thus accomplished for the graduated release operation. The speed of this charging is predetermined by calibration of the port 116 in the control slide valve 39.

Still further release of the brakes is accomplished by moving the rotary valve into "service" positions nearer the "running" position. This imposes progressively increasing spring thrusts on the diaphragm 17. This diaphragm 17 and the cooperating valve 34 operate exactly as before described to raise the brake pipe pressure each time the thrust of the spring 27 is increased. The brake pipe pressure is then maintained at a value depending on the particular setting of the rotary valve.

Each time the rotary valve is moved into a "service" position nearer "running" position it should be allowed to remain there a length of time sufficient to allow the pressure to become constant at the front end of the brake pipe.

This pressure in the rear end of the brake pipe rises an amount which is dependent upon the leakage in the brake pipe system. The resulting pressure difference between the front and rear ends of the brake pipe is approximately equal to the pressure difference existing when the brakes were fully applied. This represents a uniform rise in pressure at every point in the brake pipe system. The brakes of each of the cars are thus released an equal extent. This avoids the dangerous condition of the brakes on the forward cars becoming released while the brakes on the rear cars are still applied.

Figure 7:
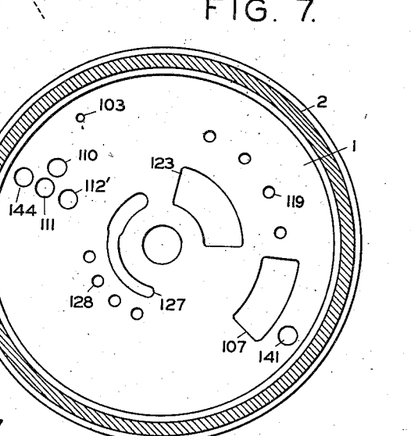
Fig. 7 is a similar view of the same with the rotary valve block removed.
Figure 8:
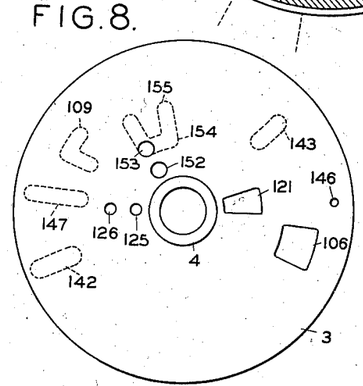
Fig. 8 is a detail plan view of the rotary valve block.

When the rotary valve 3 is in the "emergency" position the brake pipe 28 communicates with the exhaust port 141 through the cavity 142, see Figs. 7 and 8. The pressure in the brake pipe is thus quickly reduced by the air therein flowing through the port 141 into the atmosphere. A conventional vent valve in the system expedites the reduction of pressure in the brake pipe 28 in the usual manner.

In this "emergency" operation the port 106 moves beyond all of the ports 119 which communicate with the brake pipe. The port 120 in the follower valve 5 is also out of registry with the port 121 in the valve block 3 leading to the brake pipe. The brake pipe is thus completely cut off from communication with the interior of the cover 2 above the rotary valve.

The cavity 143 connects the port 144 to the exhaust port 111. The passage 145 extends from the port 144 to the left hand side of the control valve piston chamber 41.

The chamber 41 now having free communication with the atmosphere through the cavity 143 and the port 111 permits the piston 43 and its attached slide valve 53 to move to the left. This piston and the slide valve remain in this position as long as the rotary valve is in the emergency position.

The main reservoir pressure is then communicated through the port 117 and the passage 108 to the interior of the cover 2 above the rotary valve. The choke port 146 provides communication between the interior of the cover 2 and the application cylinder pipe 103. The main reservoir air then flows from the rotary valve into the application piston chamber 93 to apply the locomotive brakes.

To release the train and locomotive brakes from an "emergency" operation the rotary valve is simply moved into the "running" position. The mode of operation as far as concerns the present invention is precisely the same as releasing from an ordinary service brake application.

An "overcharging" position for the rotary valve is also provided. This is rarely used during the ordinary operation of the equipment since the "running" position provides a sufficient rise in brake pipe pressure for brake release for ordinary conditions. However, in the case of defective triple valves causing sticky brakes an overcharge of the brake pipe is necessary to procure the "release" position, the ports 106 and 120 register with the brake pipe ports 107 and 121 respectively as in "running" position. The distributing valve release pipe 92 with the port 112' is connected to the exhaust port 111 by the cavity 147, see Fig. 5. The cavity 147 also connects the port 144 to the port 111. This relieves the pressure in the chamber 41 so long as the rotary valve remains in the "overcharging" position.

The sound of the air escaping through the port 111 from the chamber 41 serves to remind the operator of the position of the rotary valve. This serves to prevent his leaving the rotary valve in this position long enough to seriously overcharge the system. The air flowing into the chamber 41 from the choke 59 provides for a continuous hiss of escaping air through the port 111.

The piston 43 and the slide valve 58 occupy a position to the extreme left with the port 117 in continuous communication with the port 118. Main reservoir air thus flows through the pipe 108 to the brake pipe 28 so long as the rotary valve remains in "overcharging" position. The gauge 148 connected to the brake pipe 28 may be observed during this operation to avoid excessive overcharging the brake pipe.

When the brake pipe reaches the desired pressure, the rotary valve is moved into "running" position. The brake pipe pressure is then maintained at the predetermined normal by the operation of the diaphragm 17.

In the "lap" position the rotary valve has all its ports and cavities out of registry with the pipes which it controls. This completely blocks off the brake pipe 28. Its rate of pressure diminution can then be tested by observing the gauge 148. This position is used for testing purposes only and has no function in the ordinary mode of operation.

In the operation known to those skilled in the art as "double heading", the "double heading" cock 149 is operated to cut off the rotary valve of the second locomotive from communication with the brake pipe. The brake pipe pressure can then be controlled from the head locomotive only.

The "double heading" cock has the port 149' which provides communication between the rotary valve and the brake pipe. The double heading cock 149 also has the cavity 150 interposed in the line 66 between the pressure chamber 65 and the charging valve chamber 62. For "double heading" the cock is turned so as to cut off communication between the rotary valve and the brake pipe and also between the pressure chamber 65 and the charging valve chamber 62. The cavity 150 is so shaped that it provides communication between the charging valve chamber 62 and the rotary valve. This maintains the charging valve chamber pressure at the normal for "running" position.

This enables an operative reduction in brake pipe pressure to be made from the first engine without the charging valve piston being automatically operated on the second engine. Otherwise the charging valve piston would be operated, cutting off the low pressure head of the compressor governor and the compressor would start operating every time the pressure chamber pressure was reduced by a reduction in brake pipe pressure from the head engine.

Having thus described this invention, what is claimed and desired to secure by Letters Patent is:

1. An air brake system including a brake pipe; a distributing valve having a pressure chamber; means controlled by the pressure in said brake pipe for providing communication between said brake pipe and said pressure chamber; a valve for charging said brake pipe; means controlled by the pressure in said pressure chamber for opening said charging valve; manually controlled means for reducing the pressure in said brake pipe and for rendering said charging valve control means inoperative.

2. An air brake system including a brake pipe; a main pressure reservoir; means for normally maintaining said brake pipe at a predetermined pressure with air from said main pressure reservoir; a governor adapted to maintain said reservoir at a predetermined pressure; a second governor adapted to maintain said main reservoir at a higher pressure; means controlled by the pressure in said brake pipe for rendering said second governor operative when the pressure in said brake pipe is below said predetermined normal; manually controlled means for reducing the pressure in said brake pipe; and means controlled by said manual means for restoring said predetermined normal pressure in said brake pipe.

3. An air brake system including a brake pipe; a main pressure reservoir; a governor adapted to maintain said reservoir at a predetermined pressure, a second governor adapted to maintain said main reservoir at a higher pressure, a distributing valve having a pressure chamber; means controlled by the pressure in said brake pipe for providing communication between said brake pipe and said pressure chamber; a valve for charging said brake pipe from said main pressure reservoir; control means, rendered operative by the reduction of pressure in said pressure chamber below a predetermined normal, for opening said charging valve; means controlled by the operation of said charging valve control means, for placing said second governor into operation; and manually controlled means for reducing the pressure in said brake pipe and for rendering said charging valve control means inoperative.

4. An air brake system including a brake pipe; a main pressure reservoir; means for normally maintaining said brake pipe at a predetermined pressure with air from said main pressure reservoir; a governor adapted to maintain said reservoir at a predetermined pressure; a second governor adapted to maintain said main reservoir at a higher pressure; means connected to said brake pipe for rendering said second governor operative when the pressure in said brake pipe is below said predetermined normal; manually controlled means for reducing the pressure in said brake pipe; means controlled by said manual means for restoring said predetermined pressure in said brake pipe by air from said main reservoir; and a manual valve operable to disconnect said brake pipe from said pressure restoring means, and from said second governor control means, and to connect said second governor control means to said pressure restoring means.

5. An air brake system including a brake pipe; a manually controlled valve having defined "running" and "service" positions; means for maintaining said brake pipe at a predetermined pressure when said manually controlled valve is in "running" position; an outlet valve communicating with said brake pipe; air pressure means for maintaining said outlet valve closed; means combined with said manually controlled valve for relieving the pressure in said air pressure means when said manual valve is intermediate said defined positions; and means effective after said manual valve is moved into said "service" position for restoring the pressure in said pressure means after the brake pipe pressure is reduced by a determined amount.

6. An air brake system including a brake pipe; a manually controlled valve having defined "running" and a plurality of "service" positions; means for maintaining said brake pipe at a predetermined pressure when said manually controlled valve is in "running" position; an outlet valve communicating with the front end of said brake pipe; air pressure means for maintaining said outlet valve closed; a port in said manually controlled valve discharging into the atmosphere; means for providing communication between this atmospheric port and said pressure means when said manually controlled valve is intermediate said defined positions; means for restoring the pressure in said pressure means and for admitting compressed air into the front end of the brake pipe after said manually controlled valve is moved into one of said "service" positions and the pressure in said brake pipe is reduced by an amount determined by the particular "service" position occupied by said manually controlled valve.

7. An air brake system including a brake pipe; a manually controlled rotary valve block having defined "running" and "service" positions; a follower valve mounted on said rotary valve and having limited freedom of movement with respect thereto; means for retarding the movement of said follower valve with respect to said rotary valve; means for maintaining said brake pipe at a predetermined pressure when said manually controlled valve is in "running" position, an outlet valve communicating with the front end of said brake pipe; air pressure means for maintaining said outlet valve closed; a port in said rotary valve communicating with the atmosphere; a second port in said rotary valve adapted to communicate with said air pressure means when said rotary valve is intermediate its defined positions; a cavity in said follower valve adapted to provide communication between said ports only when said rotary valve block is being moved toward a "service" position; means for restoring pressure in said pressure means after said rotary valve is moved into a "service" position.

8. An air brake system including a brake pipe having a predetermined pressure normally maintained therein; a main pressure reservoir; a control valve interposed between said main pressure reservoir and said brake pipe and having two operative positions in which a restricted or a relatively unrestricted flow of air respectively is admitted into said brake pipe from said main reservoir; pressure means operatively connected to said control valve and arranged to move said control valve into the position admitting restricted flow of air into said brake pipe when the pressure in said pressure means is partially relieved; said pressure means, when the pressure therein is completely relieved, being arranged to move said control valve into the position permitting the unrestricted flow of air therethrough into said brake pipe.

9. An air brake system including a brake pipe having a predetermined pressure normally maintained therein; a main pressure reservoir; a control valve interposed between said main pressure reservoir and said brake pipe and having two operative positions in which a restricted or a relatively unrestricted flow of air respectively is admitted into said brake pipe from said main reservoir; pressure means operatively connected to said control valve and arranged to move said control valve into the position admitting restricted flow of air into said brake pipe when the pressure in said pressure means is partially relieved; said pressure means, when the pressure therein is completely relieved, being arranged to move said control valve into the position permitting the unrestricted flow of air therethrough into said brake pipe; a valve body having a recess therein; pressure-responsive means closing said recess; means providing communication between said brake pipe and said recess; a calibrated spring exerting a thrust against said pressure-responsive means counterbalancing the brake pipe pressure thereagainst; manually controlled means for reducing the thrust of said spring against said pressure-responsive means; means, operated by said manually controlled means for discharging air from said brake pipe when the thrust of said spring is thus reduced; and means, operated by the movement of said pressure-responsive means toward said recess, for partially relieving the pressure in said pressure means associated with said control valve; and means for completely relieving the pressure in said pressure means when said manually controlled means is moved back into its normal position.

10. An air brake system including a brake pipe; a main pressure reservoir; a control valve body having said main pressure reservoir and said brake pipe connected thereto; a valve in said body arranged to provide communication between said main pressure reservoir and said brake pipe; a movable piston in said body having main pressure reservoir pressure exerted against one of its sides; a stem connecting said piston to said control valve, said stem having a restricted passage therein providing communication between the opposite sides of said piston; said valve being arranged to admit main pressure reservoir air into said brake pipe after being moved by said piston when the pressure is relieved on the side opposite the main reservoir pressure; and a removable plug in said valve body to permit the entry of a cleaning instrument into the restricted passage in said stem.

11. An air brake system including a brake pipe; a control valve body having said main pressure reservoir and said brake pipe connected thereto; a valve in said body having two operative positions in which communication is provided for a restricted or a relatively unrestricted flow of air, respectively, into said brake pipe from said main reservoir; pressure-responsive means in said valve body having a constant pressure exerted against one of its sides and a variable pressure against the other side; resilient means arranged to be engaged by said pressure responsive means to limit its further movement after said variable pressure has been partially relieved, said resilient means being compressed and said pressure responsive means making a further movement when said variable pressure is substantially completely relieved; means operatively connecting said pressure-responsive means to said valve; all constructed and arranged so that said valve is moved into the position for admitting a restricted flow of air into said brake pipe when said variable pressure is substantially relieved, and said valve being moved into the position for admitting an unrestricted flow of air into said brake pipe when said variable pressure is substantially completely relieved.

12. An air brake system including a brake pipe having a predetermined pressure normally maintained therein; a main pressure reservoir; a valve body; a manually controlled rotary valve in said body; a control valve; means connecting said main pressure reservoir to said brake pipe through said control valve and said rotary valve; pressure means operative, when the pressure therein is relieved, to open said control valve; said valve body having a recess therein; pressure-responsive means closing said recess; means providing communication between said brake pipe and said recess; a calibrated spring exerting a thrust against said pressure-responsive means counterbalancing the brake pipe pressure thereagainst; means for reducing the thrust of said spring against said pressure-responsive means by movement of said rotary valve; means, controlled by said rotary valve, for discharging air from said brake pipe when the thrust of said spring is thus reduced; means, operated by the movement of said pressure-responsive means toward said recess, for relieving the pressure in the pressure means associated with said control valve; said rotary valve being arranged to provide relatively unrestricted communication between said control valve and said brake pipe when in its normal condition, and arranged to provide restricted communication between said control valve and said brake pipe after said rotary valve has been moved in reducing the thrust of said calibrated spring.

13. An air brake system including a brake pipe; a control valve arranged to admit air into the front end of said brake pipe to maintain normally a predetermined pressure therein; a rotary valve interposed between said control valve and said brake pipe and arranged, when in normal position, to provide relatively unrestricted communication between said control valve and said brake pipe; means controlled by the movement of said rotary valve for reducing the pressure a determined amount in said front end of the brake pipe; said control valve being arranged to admit air into said front end of the brake pipe in order to maintain it at the determined reduced pressure; said rotary valve being arranged, after it has been moved out of normal position, to provide restricted communication between said control valve and said brake pipe.

14. An air brake system including a brake pipe; a manually controlled rotary valve block having defined "running" and a plurality of "service" positions; a follower valve cooperating with said rotary valve and having limited freedom of movement with respect thereto; means for retarding the movement of said follower valve with respect to said rotary valve; a control valve connected to said brake pipe through said rotary valve and adapted to maintain said brake pipe at a determined pressure which depends upon the selected position of said rotary valve; said rotary valve being arranged to provide relatively unrestricted communication between said control valve and said brake pipe when said rotary valve is in said "running" position and arranged to provide relatively restricted communication between said control valve and said brake pipe when the rotary valve is in one of said "service" positions; and means associated with said follower valve for providing relatively unrestricted communication between said control valve and said brake pipe when said rotary valve is being moved toward said "running" position.

QUINTEN E. CONNER.